Jan. 17, 1961

R. R. FIKE 2,968,089

BRONZE TO ALUMINUM BOND AND THE
METHOD OF MAKING IT
Filed March 30, 1956

Inventor:
Russell R. Fike
By: Joseph R. Dwyer Atty

United States Patent Office 2,968,089
Patented Jan. 17, 1961

2,968,089

BRONZE TO ALUMINUM BOND AND THE METHOD OF MAKING IT

Russell R. Fike, Euclid, Ohio, assignor to Borg-Warner Corporation, Chicago, Ill., a corporation of Illinois Filed Mar. 30, 1956, Ser. No. 575,132

2 Claims. (Cl. 29—183.5)

This invention relates to a process of bonding metals of different characteristics and more particularly to a process of bonding aluminum and its alloys to heavier metals, such as copper-lead alloys known as bronzes, and to the composite articles so produced.

In Russell R. Fike et al., United States application Serial No. 514,536, filed June 10, 1955, now abandoned, it is explained that light metals such as aluminum and its alloys, have found wide acceptance where great strength and rigidity per unit weight are required, such as in the manufacture of aircraft parts, for example, bearings and pump bushings. It is also explained that while aluminum and its alloys provide good bearing surfaces, it is well-known that copper-lead alloys offer superior bearing surfaces, and that difficulty has been encountered uniting aluminum and its alloys to these copper-lead alloys, since a strong, ductile bond is rarely obtained. The aforementioned application sets forth a process of producing a bond between aluminum and its alloys and a copper-lead alloy which results in a bond of maximum strength and ductility. The process employed therein includes the use of tin or a composition composed mainly of tin as the bonding agent for ultimately uniting the parts. Due to the relatively low melting temperature of the bonding agent described in the aforementioned application, it will be obvious that the composite article produced by a process therein will be limited to use in relatively low temperature applications, such, for example, where the temperature does not exceed 300° F. By the present invention, a process productive of a bond for use at high temperatures is provided, such, for example, where the temperature ranges to 500° F. Therefore, the principal object of this invention is to provide a process of bonding aluminum and its alloys to copper-lead alloys which provides a bond of maximum strength and ductility, usable in high temperature installations.

More particularly, the principal object of this invention is to provide a process of bonding aluminum and its alloys to copper-lead alloys which comprises using a silver-tin-lead alloy as a bonding agent and uniting the surfaces of the parts to be joined at temperatures below the melting points of the aluminum or its alloys and the copper-lead alloy.

A further object of this invention is to provide a high temperature, high strength bond between aluminum and its alloys and a copper-lead alloy.

A still further object of this invention is to provide an aluminum or an aluminum housing with a bronze bearing surface thereon for use at relatively high temperatures.

Still further, an object of this invention is to provide an aluminum or aluminum alloy pump bushing with a bronze bearing face thereon useable at relatively high temperatures.

These and other objects and features of this invention will become apparent from the following description when taken with the accompanying drawing in which.

Figure 1:
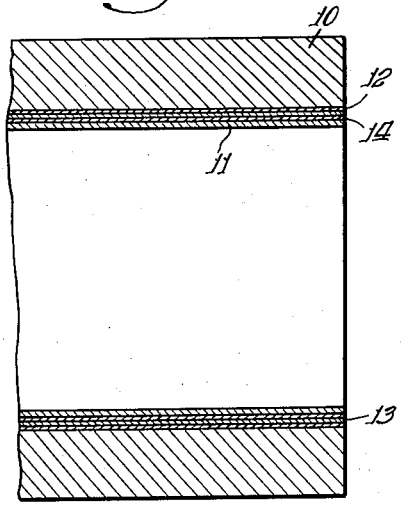
Figure 1 is a sectional view of a bearing member and housing formed in accordance with this invention.
Figure 2:
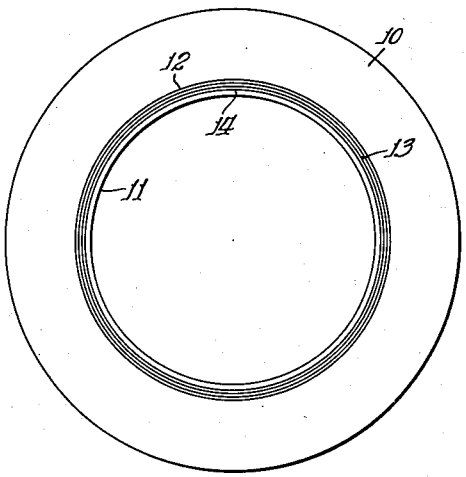
Figure 2 is an elevational view of the bearing of Figure 1.

Reference is now made to Figures 1 and 2, wherein there is illustrated a lined bearing member comprising a housing or sleeve 10 of aluminum or an alloy composed mainly of aluminum, a bearing liner or bushing 11 of a copper-lead alloy, a plating 12 of copper and a plating 13 of a copper-tin alloy on the housing, and a bonding agent 14 of a silver-tin-lead alloy bonding the housing and the liner. A suitable copper-lead alloy may consist of 80% copper and 20% lead and a suitable aluminum alloy, known as 17S, having a composition of 2.5% copper, 0.5% magnesium, 0.5% manganese, balance aluminum, may be used. It is of course to be understood that other alloys having suitable properties may be used. The copper-tin alloy which comprises the plating 13 has a composition of 80% to 85% copper, with the balance tin, and the bonding agent 14 is an alloy having a composition of 95% lead, 1½ to 2½% silver, and the balance tin.

In making the structure just described, the metal parts are first machined to their approximate shapes and the metals are prepared for bonding, as follows:

Preparation of the aluminum alloy (1) De-grease to remove cutting oils.
(2) Etch in 10% caustic soda for 10 minutes at room temperature.
(3) Rinse in water at 140° F.
(4) Dip in concentrated nitric acid for 5 to 15 seconds, or until all smut is removed.
(5) Rinse in cold water.
(6) Immerse in caustic zincate bath for 15 to 45 seconds. The work should be uniformly gray. If the work is spotty, repeat steps 4, 5 and 6.
(7) Rinse in cold water.
(8) Copper strike or flash.
(9) Rinse in cold water.
(10) Plate with copper-tin alloy .001" to .002" minimum.
(11) Rinse in cold water.
(12) Rinse in hot water.
(13) Dry.
(14) Apply a suitable flux to the metal and then apply a silver-tin-lead alloy at a temperature of 650 to 825° F.

Separation of the copper-lead liner (1) Clean and etch.
(2) Apply a suitable flux to the metal and then apply a coating of a silver-tin-lead alloy at 650 to 825° F.

The purpose of the copper strike or flash and the copper-tin alloy plating on the aluminum member is to provide a surface to which the bonding material will adhere, since this material will not adhere to aluminum directly because of the aluminum oxide film that forms instantly when aluminum is exposed to air. The copper is flashed on the aluminum for good adherence and the copper-tin alloy is plated thereon to a thickness thereof of at least 0.001 to 0.002 inch. The usual thickness of the last-mentioned plating is 0.005 inch. The copper-tin alloy is employed since it forms a good surface for the adherence of the bonding metal.

As in the aforementioned application, the usual flux is a highly active and corrosive acid halogen type. Of course, other fluxes may be employed in this process.

The temperatures employed in making the joint are in the range of 650 to 825° F. Thus, it may be seen that a relatively high bonding temperature is employed when using this process.

Figure 3:
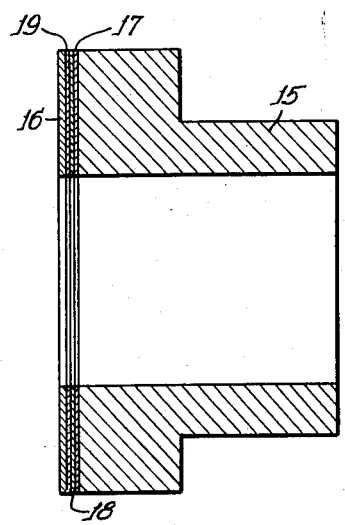
Figure 3 is a sectional view of a pump bushing formed in accordance with this invention.

Figure 3 represents a pump bushing structure as may be employed in a pressure loaded pump of the type shown in United States Patent No. 2,420,622, to John A. Lauck et al. The bushing structure comprising a bushing member 15 of aluminum or aluminum alloy and a copper-lead alloy bearing surface 16, a copper flash 17, a copper-tin plating 18 and the bonding agent 19, such as a silver-tin alloy. The parts are prepared and assembled in the same manner as set forth with regard to the Figures 1 and 2 embodiment and the same alloys may be employed. Of course, this bond should be made under pressure to assure a good completed structure. It is to be understood that the tubular portion may be provided with an internal or external bonded bearing surface if necessary or desirable.

Figure 4:
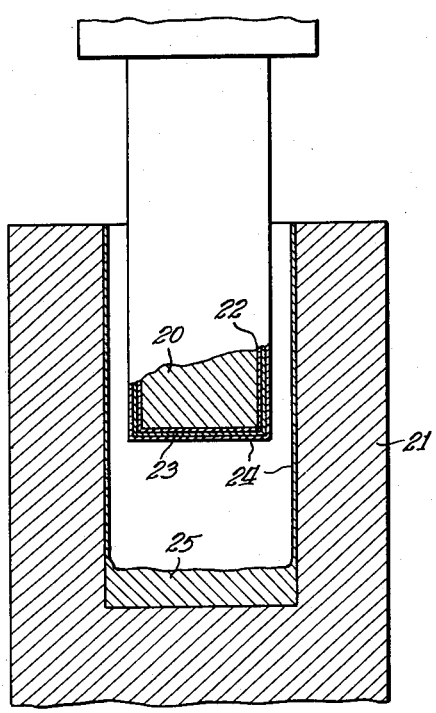
Figure 4 is an illustration showing how the process of this invention is performed.

Figure 4 represents one manner in which the process may be performed. Reference character 20 represents the aluminum or aluminum alloy member, 21 represents the copper-lead member, 22 the copper flash, 23 the copper-tin plating of the aluminum or aluminum alloy member and 24 the bonding plating. In this figure, provision is made for providing a pool 25 of molten bonding metal; however, the preparation of the metals and the performance of the process is the same as set forth in the description in the Figures 1 and 2 embodiment. Also this instant embodiment produces an outside disposition of the bearing member.

In each of the above described modifications, it has been found that the articles produced may be machined to final dimension without affecting the bond.

While I have described this invention in connection with several embodiments thereof, it is to be understood that this is by way of illustration and not by way of limitation and the scope of this invention is defined solely by the appended claims which should be construed as broadly as the prior art will permit.

I claim:

1. The process of bonding a first member consisting of a metal of the class consisting of aluminum or aluminum alloy to a second copper-lead alloy member comprising the steps of etching said first member in a caustic solution, dipping said first member in an acid solution, plating said etched first member with zinc, plating said first member with copper, plating said first member with a copper-tin alloy to a thickness of at least 0.001 to 0.002 inch; coating said first and said second members with a silver-tin-lead alloy having a composition of about 95% lead, 1½ to 2½% silver and the balance tin, and assemblying said members at a temperature of 650° F. to 825° F., said copper-tin alloy consisting of about 80% to 85% copper and correspondingly about 20% to 15% tin.

2. A composite bearing comprising a layer of a metal of the class consisting of aluminum and aluminum alloys, a thin layer of zinc, a thin layer of copper, a layer of copper-tin alloy at least 0.001 to 0.002 inch thick, a silver-tin-lead alloy layer, and a bearing layer of copper-lead alloy.

References Cited in the file of this patent

UNITED STATES PATENTS

| | | |
|---|---|---|
| 440,952 | Land | Nov. 18, 1890 |
| 909,924 | Monnot | Jan. 19, 1909 |
| 1,840,724 | Koehring | Jan. 12, 1932 |
| 2,513,365 | Rogoff | July 4, 1950 |
| 2,569,149 | Brennan | Sept. 25, 1951 |
| 2,586,099 | Schultz | Feb. 19, 1952 |
| 2,741,016 | Roach | Apr. 10, 1956 |

FOREIGN PATENTS

| | | |
|---|---|---|
| 552,330 | Great Britain | Apr. 1, 1943 |